(12) United States Patent
Koch et al.

(10) Patent No.: US 6,976,575 B2
(45) Date of Patent: Dec. 20, 2005

(54) PROCESS AND DEVICE FOR THE CONTINUOUS CONVEYANCE OF CONFECTIONS

(75) Inventors: Bernhard Koch, Hannover (DE); José de Vilchez-Kehr, Hannover (DE); Reinhard Merge Isberg, Garbsen (DE)

(73) Assignee: Klockner Hansel Processing GmbH, Hannover (DE)

( * ) Notice: Subject to any disclaimer, the term of this patent is extended or adjusted under 35 U.S.C. 154(b) by 105 days.

(21) Appl. No.: 10/224,788

(22) Filed: Aug. 21, 2002

(65) Prior Publication Data

US 2003/0047422 A1    Mar. 13, 2003

(30) Foreign Application Priority Data

Aug. 21, 2001  (DE) ................................ 101 39 947

(51) Int. Cl.[7] ............................................ B65G 33/00
(52) U.S. Cl. ........................... 198/657; 406/53; 406/65
(58) Field of Search ............................... 198/657, 671; 406/53, 58, 65

(56) References Cited

U.S. PATENT DOCUMENTS

| 4,274,786 | A | * | 6/1981 | Svensson et al. ........... 414/218 |
| 4,881,862 | A | * | 11/1989 | Dick ........................... 414/218 |
| 5,558,203 | A | * | 9/1996 | Herm et al. ................. 198/661 |
| 5,996,770 | A | * | 12/1999 | Kjellqvist .................... 198/672 |
| 6,251,452 | B1 | * | 6/2001 | Weinstein et al. ........... 426/249 |
| 6,676,864 | B2 | * | 1/2004 | Hawley ....................... 264/40.1 |
| 6,696,003 | B2 | * | 2/2004 | Cediel et al. ................ 264/255 |
| 6,722,489 | B1 | * | 4/2004 | Cook .......................... 198/608 |

FOREIGN PATENT DOCUMENTS

| DE | 31 30 968 | 2/1983 | ............ A23G 3/10 |
| EP | 0 418 106 A1 | 3/1991 | ............ A23G 3/00 |
| EP | 0 820 701 A2 | 1/1998 | ............ A23G 1/20 |
| FR | 2 733 122 | 10/1996 | ............ A23G 3/32 |
| GB | 1 050 549 | 12/1966 | ............ A23G 3/04 |
| GB | 1 271 725 | 4/1972 | ............ A23G 3/02 |
| GB | 1 275 477 A | 5/1972 | ............ C13G 1/04 |

* cited by examiner

Primary Examiner—Richard Ridley
(74) Attorney, Agent, or Firm—Pendorf & Cutliff

(57) ABSTRACT

Described is a conveyor for confections having the design that the material is conveyed along a flow path which is essentially free from abrupt detours or direction changes. In the case of utilization of helix rotors as conveyors this occurs in that the helical rotors (3, 11) are mounted respectively on only one of their ends and the discharge column (10, 20) is provided in essentially the axial direction. These columns may be conical and preferably coaxial but in certain cases may also be slightly eccentric to the axis of the helical rotors.

9 Claims, 1 Drawing Sheet

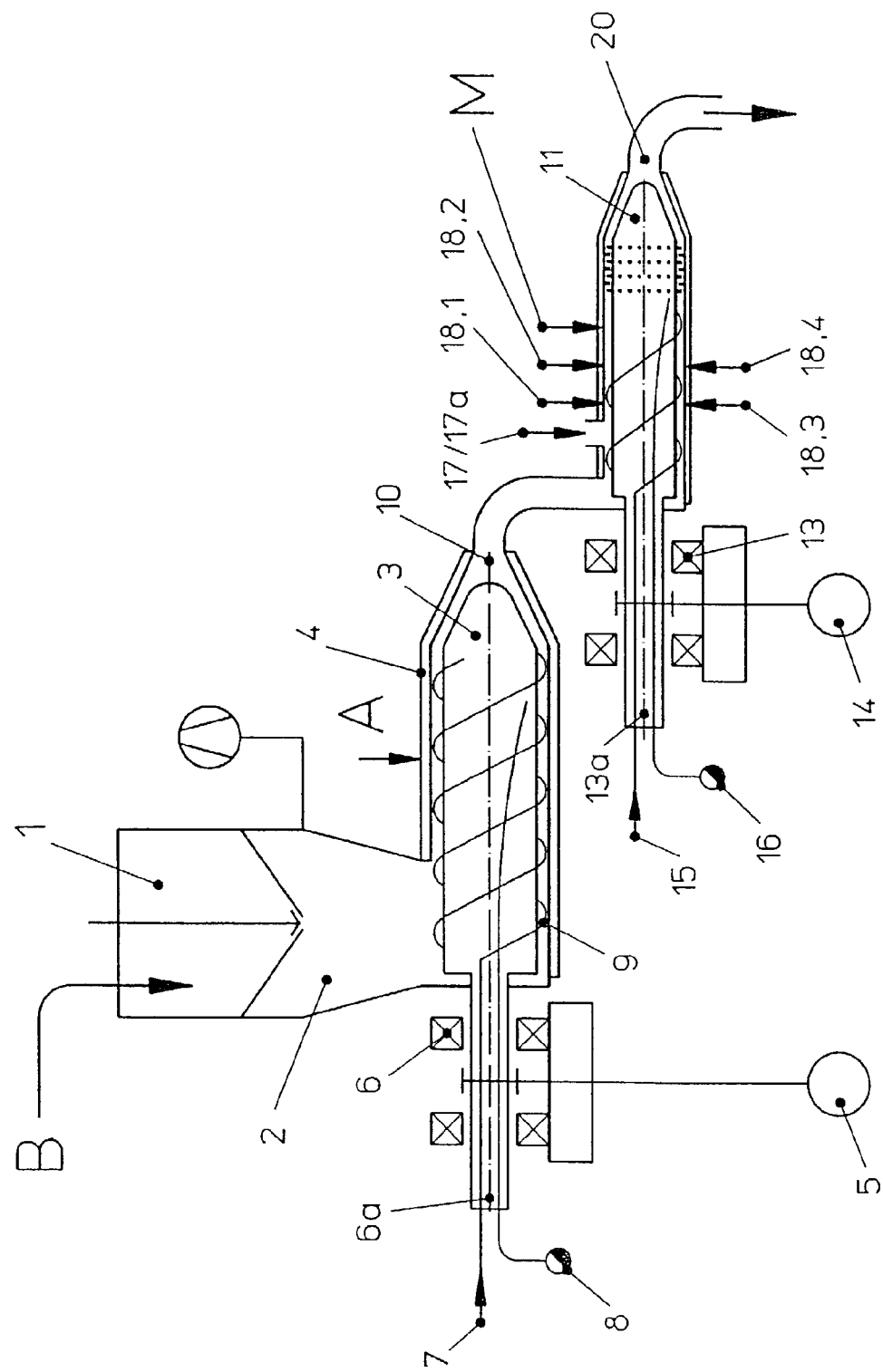

PROCESS AND DEVICE FOR THE CONTINUOUS CONVEYANCE OF CONFECTIONS

BACKGROUND OF THE INVENTION

1. Field of the Invention

In the industrial manufacture of sweets, continuously operating plants are well known. These plants generally include a cooker, in which confections (for example candy) are produced by mixing according to predetermined recipes, and a subsequent processing line in which the material, in certain cases mixed with additional ingredients, is cooled and then subsequently shaped into individual candies.

2. Description of the Related Art

The continuous conveyance of the material, in particular from the cooker or, as the case may be, an evaporation room downstream of the cooker, to a cooling line usually occurs by means of a discharge screw conveyor which has the form of a helical rotor rotating within a static housing. The rotor has until now been mounted on both ends of the static housing, and includes a discharge column extending out approximately perpendicular to the rotor axes. The stator housing at the same time is provided with supply columns, through which the possible ingredients such as coloring agents, aromas or medicinally active agents, which could be gaseous, liquid, pasty, granular or in powder form, can be continuously added or dosed.

It has been found, in the plants operating today, that the required consistency of treatment of the material cannot always be guaranteed. This has now been found to be a consequence of the fact that different portions of the material can have different dwell times, particularly at the end of the screw rotor, and the material in each case experiences a sharp detour during discharge, whereby temperature and viscosity differences in the material or other disadvantages result, for example an undesired recrystallization could occur in the material.

SUMMARY OF THE INVENTION

The present invention provides relief for this problem. It is the object of the invention to guarantee a consistent and gentle treatment of the material on the way from cooker to the cooling-line, and this objective is achieved in that the material is conveyed along a flow path which is essentially free of abrupt detours or sharp bends.

Regarding the equipment aspect of the invention, this is achieved in that the discharge screw conveyor and/or the mixer are provided with helical rotors mounted or supported only on the inlet side, and in that the outlet columns of these devices are oriented essentially along the axial direction of the helical rotors. Thereby it is achieved in simple and very elegant manner, that at the exit end of the helical rotor uncontrolled dwell times or abrupt deflectors or detours are avoided, which results in an even and gentle handling of the material.

BRIEF DESCRIPTION OF THE DRAWING

The invention also results in further advantages, which are described in greater detail in the following description of an illustrative embodiment on the basis of the drawings. The drawings show a schematic of a part of a continuous device for production of confections designed in accordance with the invention.

DETAILED DESCRIPTION OF THE INVENTION

In the schematically illustrated equipment, a confectionary material such as for example a candy substance B moves continuously from a cooker (not shown in greater detail) to an evaporation space 1 and from there further to a vacuum space 2. From this vacuum space the material is discharged by means of a discharge helix A, comprised of a helical rotor 3 and a stationary housing 4. The rotor 3 as well as the stationary housing 4 and in certain cases the helix blades 9 are heatable.

The rotor 3 is supported only on the inlet side in a bearing 6 and is there driven via a motor 5. The supply of steam 7 and the withdrawal of condensate 8 from the internal space and in certain cases the heated blades 9 of the rotor occurs via the shaft end 6a of the rotor at the mounted end. These blades can be simple or compound or multi-helical and exhibit a constant or a non-constant pitch, depending upon the type and composition of the candy substance B to be conveyed and taking into consideration the possible change in volume of the mass when leaving the vacuum or low pressure area 2. The same applies for the diameter of the shaft of the rotor 3, which can be constant, stepped or continuously increasing. The discharge area 10 of the discharge screw conveyor A is shown in the drawing as being conical and coaxial to the rotor 3, which is the preferred embodiment. The discharge area can also be designed to be eccentric-conical, that is, displaced to the axis of the rotor 3 or in certain cases also at a slight angle thereto; it need merely be ensured, that the discharge end of the rotor 3 does not cause any abrupt change in direction of the mass.

Downstream of the discharge screw conveyor A is one or more helical mixers, of which one mixer M is represented. This mixer (and also every subsequent mixer, in the case that multiple mixers are provided) includes a static housing 12 and a rotor 11. This rotor 11 is also mounted only on the inlet side in a bearing 13 and is there driven by a motor 14. Besides this, the internal space of the rotor 11 and in certain cases its blades 19 as well as the rotor 3 are heatable, whereby here also the supply of steam 15 and the withdrawal of condensate 16 out of the internal space and in certain cases the heated blades 19 occurs via the end of the shaft 13a on the bearing side. Further, the mixture includes dosing columns 17 and 18.1–18.4 for introducing ingredients, wherein particular care is to be taken, that the rotor 11 can produce a zone free of over-pressurization 17a, which makes possible the addition of for example particulate and powdery ingredients via gravity. Further, here also the discharge area 20 of the mixer M is preferably designed to be coaxial-conical, but could however also be eccentric-conical, as was already described for the discharge screw conveyor A. From this discharge area 20 the material is available for further processing, which need not be described herein in greater detail.

The one sided—that is, cantilevered or flying—supporting of the helical rotors of the discharge conveyor A and the mixer M make possible, as has already been indicated many times above, a flow path design free of changes in direction in the discharge area 10 or as the case may be 20. A further important advantage is to be seen herein, that there is no storage or dwell time under pressure, and thus leaks can be advantageously avoided, which might occur under conditions such as continuous pressurization of the confections being conveyed. This is particularly significant with abrasive materials and/or high temperatures. Further, the absence of abrupt detours of the material is particularly advantageous for a reduction in the mechanical stressing of the devices themselves.

It has already been mentioned, that the rotor 11 of the mixer M can produce a pressure-free zone. This applies naturally also for the rotor 3 of the discharge conveyor A. In general, both rotors can be so designed and operated, that during conveyance of the material a pressure differential is produced, which for example produces a pressure reduction or vacuum on the suction side and a pressure increase at the pressure side.

What is claimed is:

1. A device for the continuous conveyance of confection material, comprising:
    a screw conveyor comprising a fixed housing and a helical rotor as means for conveyance, said rotor (3, 11) including a shaft and blades, said shaft having a supported end and a free end, said supported end mounted in bearings;
    a discharge column (10) downstream of the screw conveyor and having a connection to the screw conveyor essentially in the axial direction of the helical rotor; and
    heating means for the helical rotor, wherein said helical rotor has a hollow internal space, and wherein said means for heating comprise steam (7) supplied to the helical rotor internal space and optionally the blades of the rotor, and means for withdrawal of condensate (8), and wherein said supply and withdrawal occurs respectively at the shaft end (6a).

2. A device according to claim 1, wherein said discharge column (10) connection is conically shaped and oriented axially or eccentrically to the axis of the helical rotor.

3. A device according to claim 1, wherein the screw conveyor has an inlet side and an outlet side, and wherein said bearing (6) is provided at the inlet side of the screw conveyor.

4. A device for the continuous conveyance of confection material, comprising:
    a screw conveyor comprising a fixed housing and a helical rotor as means for conveyance, said rotor (3) including a shaft and blades, said shaft having a supported end and a free end, said supported end mounted in bearings;
    a discharge column (10) downstream of the screw conveyor and having a connection to the screw conveyor essentially in the axial direction of the helical rotor; and
    heating means for the helical rotor, wherein said helical rotor has a hollow internal space, and wherein said means for heating comprise steam (7) supplied to the helical rotor internal space and optionally the blades of the rotor, and means for withdrawal of condensate (8), and wherein said supply and withdrawal occurs respectively at the shaft end (6a);
    wherein the helical rotor (3, 11) is a component of the conveyor device for conveying the confections B, wherein said conveyor is arranged between a cooker or an evaporation space (2) downstream of the cooker and a cooling line, and wherein said conveyor device is comprised of a discharge helix (A) and a thereto connected helical mixer (M).

5. A device according to claim 4, further comprising one or more helical rotor mixers downstream of the discharge rotor helix (A).

6. A device according to claim 4, wherein said blades (9) of the rotor (3) of the discharge rotor helix (A) are simple or multi-threaded.

7. A device according claim 4, wherein the blades (9) of the rotor (3) of the discharge helix (A) have a non-constant pitch.

8. A device according to claim 4, wherein the diameter of the shaft of the rotor (3) of the discharge helix (A) is non-constant.

9. A process for the continuous conveyance of confection material, comprising:
    conveying confection material from a cooker to a point downstream of the cooker via a conveyor,
    wherein said material is conveyed along a flow path essentially free of sharp bends,
    the flow path comprising a screw conveyor comprising a fixed housing and a helical rotor as means for conveyance, said rotor (3, 11) including a shaft and blades, said shaft having a supported end and a free end, said supported end mounted in bearings; and
    a discharge column (10) downstream of the screw conveyor and having a connection to the screw conveyor essentially in the axial direction of the helical rotor; and
    heating the helical rotor having a hollow internal space using steam (7) supplied to the helical rotor internal space and optionally the blades of the rotor, and
    withdrawing a condensate (8) at the shaft end (6a).

* * * * *